United States Patent
Dyvadheenam et al.

(12)

(10) Patent No.: US 11,010,486 B2
(45) Date of Patent: May 18, 2021

(54) SECURE OFFLINE STREAMING OF CONTENT

(71) Applicant: Citrix Systems, Inc., Fort Lauderdale, FL (US)

(72) Inventors: Noah Dyvadheenam, Bangalore (IN); Satish Vanahalli, Bangalore (IN); Chirag Agarwal, Bangalore (IN); Arnav Akhoury, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 308 days.

(21) Appl. No.: 16/223,475

(22) Filed: Dec. 18, 2018

(65) Prior Publication Data

US 2020/0193044 A1 Jun. 18, 2020

(51) Int. Cl.
*H04L 29/06* (2006.01)
*G06F 21/62* (2013.01)
(Continued)

(52) U.S. Cl.
CPC ...... *G06F 21/6218* (2013.01); *G06F 9/45558* (2013.01); *G06F 12/1408* (2013.01); *G06F 21/606* (2013.01); *H04L 63/0428* (2013.01); *H04L 63/108* (2013.01); *H04L 67/1097* (2013.01); *G06F 2009/45562* (2013.01);
(Continued)

(58) Field of Classification Search
None
See application file for complete search history.

(56) References Cited

U.S. PATENT DOCUMENTS

| 8,639,625 | B1 * | 1/2014 | Ginter | G06F 21/51 |
| | | | | 705/51 |
| 2014/0304505 | A1 * | 10/2014 | Dawson | H04L 63/0428 |
| | | | | 713/165 |

(Continued)

FOREIGN PATENT DOCUMENTS

WO 2017004447 A1 1/2017

OTHER PUBLICATIONS

G J Suja; Sangeetha, Jose. New approach for highly secured I/O transfer with data on timer streaming. 2016 3rd International Conference on Computing for Sustainable Global Development (INDIACom). https://ieeexplore.ieee.org/stamp/stamp.jsp?tp=&arnumber=7724391 (Year: 2016).*

(Continued)

*Primary Examiner* — Jeremiah L Avery
(74) *Attorney, Agent, or Firm* — Banner & Witcoff, Ltd.

(57) ABSTRACT

Methods, systems, and computer-readable media for secure offline transmission of a plurality of data segments from a sending device to one or more receiving devices. The sending device and the one or more receiving devices may communicate via an offline local network. A secure, encrypted container may be created at the receiving device to temporarily cache the received data segments one at a time and the encrypted storage container prevents access by one or more applications of the receiving device to data stored therein based on storage instructions from the sending device. The encrypted container may be configured to store the data segments such that less than all of the data segments are stored at the receiving device at any one time.

20 Claims, 11 Drawing Sheets

(51) Int. Cl.
    *G06F 9/455*     (2018.01)
    *G06F 12/14*     (2006.01)
    *G06F 21/60*     (2013.01)
    *H04L 29/08*     (2006.01)

(52) U.S. Cl.
    CPC .............. *G06F 2009/45583* (2013.01); *G06F 2221/2143* (2013.01)

(56) References Cited

U.S. PATENT DOCUMENTS

2017/0005790 A1* 1/2017 Brockmann .......... H04L 9/0822
2018/0150414 A1* 5/2018 Wilson ................ G06F 12/1458

OTHER PUBLICATIONS

Sun, Jian-hui; Wang, Jin-hui. A transport stream decoder subsystem design with a dedicated processor. 2012 IEEE 11th International Conference on Solid-State and Integrated Circuit Technology. https://ieeexplore.ieee.org/stamp/stamp.jsp?tp=&arnumber=6466729 (Year: 2012).*

Wirtten Opinion and International Search Report of PCT/US2019/066870 dated Mar. 19, 2020.

* cited by examiner

SECURE OFFLINE STREAMING OF CONTENT

FIELD

Aspects described herein generally relate to computers, networking, hardware, and software. In particular, one or more aspects of the disclosure generally relate to computer systems and methods for securely sharing data or content from a sending device to a receiving device in an offline environment.

BACKGROUND

Users of computing devices often desire to share content or data with computing devices of other users. For example, a user of a mobile device may take a photo of a group of friends and want to share that picture with the other people in the photo. In another example, speakers may wish to share the contents of a display of a computing device to other computing devices while giving a speech. Typically, sharing content or data between computing devices uses the Internet or other online networks that include safeguards such as firewalls and encryption to ensure that the shared content is secure during transmission. In offline environments, sharing of data or content may occur from device-to-device through file sharing applications that transmit the data from a sending device to a receiving device.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

The solutions described above provide for the entire shared content to be stored on the receiving device that can then be copied, manipulated, altered, and shared with other, unauthorized devices. In offline environments, sharing of data or content is either unavailable or open to even further security issues as the safeguards present on the Internet or other public network is no longer present during the transfer of data. To overcome these limitations in the prior art, and to overcome other limitations that will be apparent upon reading and understanding the present specification, aspects described herein are directed towards a method for data sharing in an offline environment. The method may include operations directed to receiving, by a receiving device, a first data segment of a plurality of data segments from a sending device via a local network, wherein the sending device and the receiving device directly communicate via the local network and generating an encrypted storage container for storing the first data segment, wherein the encrypted storage container prevents access by one or more applications of the receiving device to data stored therein based on storage instructions from the sending device. The method may also include operations directed to storing, by the receiving device, the first data segment in the encrypted storage container so that less than all of the plurality of data segments are stored on the receiving device at one time and processing, by the receiving device, the first data segment to provide an output to a user of the receiving device.

Other aspects described herein are directed towards a device including one or more processors and a receiver service module that, when executed by the one or more processors, cause the receiver service module to perform operations. Such operations may include receiving a first data segment of a plurality of data segments and a storage instruction from a sender service module executed on a sending device, the first data segment and the storage instruction received via a local network and instantiating an encrypted storage container on the device for storing data, wherein the encrypted storage container prevents access by one or more applications of the device to data stored therein based on the received storage instruction from the sender service module. Additional operations may include storing the first data segment in the encrypted storage container so that less than all of the plurality of data segments are stored on the encrypted storage container at one time and processing the first data segment to display a first portion of the data on a display of the device Still other aspects described herein are directed towards one or more non-transitory computer-readable media storing computer-executable instructions that, when executed by a computer system comprising at least one processor, and least one memory, cause the computer system to perform a method. Operations of the performed method may include receiving, by a receiving device, a first data segment of a plurality of data segments from a sending device via an offline local network, wherein the sending device and the receiving device directly communicate via the local network and generating an encrypted storage container for storing the first data segment, wherein the encrypted storage container prevents access by one or more applications of the receiving device to data stored therein based on storage instructions from the sending device. The operations may also include storing the first data segment in the encrypted storage container so that less than all of the plurality of data segments are stored on the receiving device at one time and processing the first data segment to provide an output to a user of the receiving device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
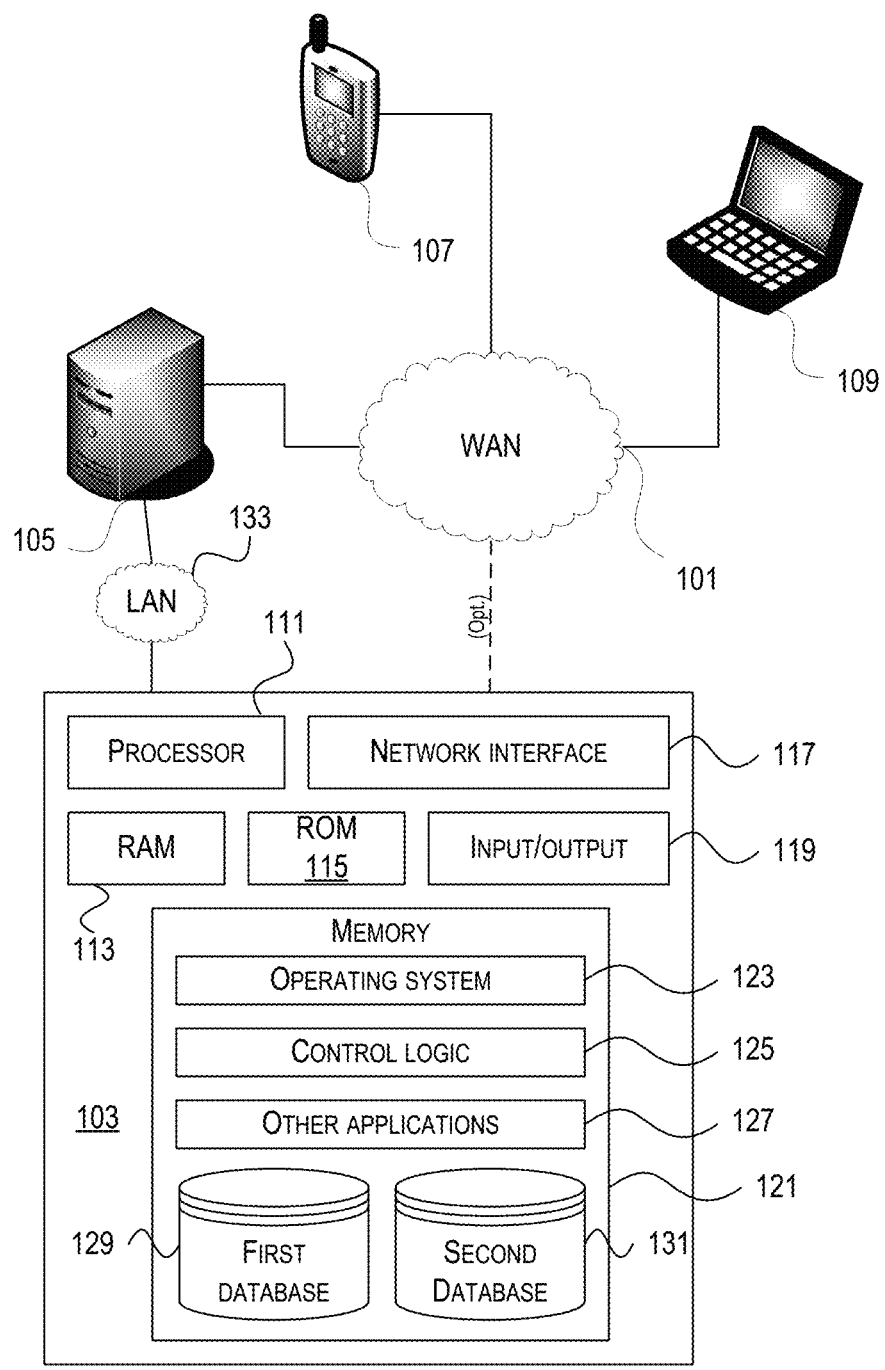
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards secure offline data or file sharing (also referred to as a data stream) from a device to one or more receiving devices in the vicinity of the sending device. A data stream may include the transmission of data from a sending device to a receiving device, often in a sequence of ordered data packets, although any type of transmission of data from the sending device to the receiving device may be considered as a data stream. In one example, the streamed content or data may be segmented by the sending device and each segment may be temporarily cached at the receiving device. A secure, encrypted container may be created at the receiving device to temporarily cache the received segments one at a time. Rights to access the secure container may be controlled by the sending device through a service executed on the receiving device such that native applications on the receiving device cannot access the received segments. In addition, the sending device may create a secure ad-hoc or local wired or wireless network to connect to the one or more receiving devices and may authenticate those receiving devices authorized to receive the content through a password exchange or other secure authorization measure. Stored data or content segments at the receiving device may be routinely flushed or deleted from the secure storage to minimize the amount of data residing on the receiving device at any one time. Deleting portions of the data stream residing on the receiving device such that less than the entire file or data stream is present on the receiving device at one time prevents unauthorized copying, manipulating, altering, and sharing of the data with other, unauthorized devices. Further, a loss of connection or communication between the sending device and a receiving device during the streaming of the content or data may trigger an automatic flushing of the secure storage such that no content or data remains on the receiving device after the streaming session has ended. In this manner, a secure offline content streaming solution is provided that maintains the security of the data shared in that the sending device controls when and how the receiving devices view and/or process the streamed content.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
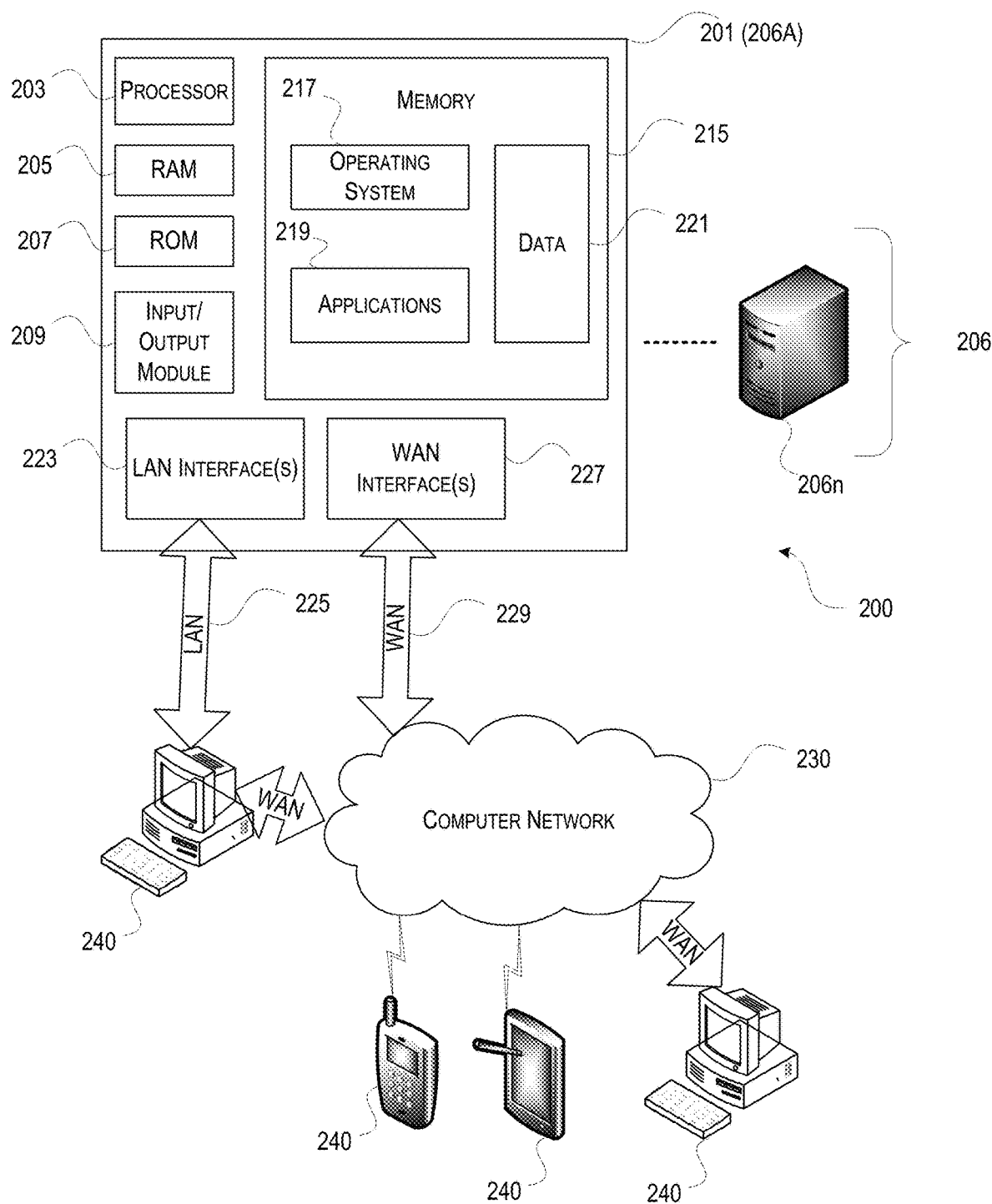
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Enterprise Mobility Management Architecture

Through the systems and methods described herein, a secure offline content streaming of content or data from a device to one or more receiving devices in the vicinity of the sending device is provided. By segmenting the streamed content or data and temporarily caching the segments at the receiving device, less than the whole of the content is ever stored at the receiving device at any time. The creation of a sender-controlled, secure, and encrypted container at the receiving device to temporarily cache the received segments one at a time further protects the content segments. In addition, the sending device may create a secure ad-hoc or local wired or wireless network to connect to the one or more receiving devices and may authenticate those receivers authorized to receive the content through a password exchange or other secure authorization measure. Stored data or content segments at the receiving device may be routinely flushed or deleted from the secure storage to minimize the amount of data residing on the receiving device at any one time and all content may be flushed in the instance of a loss of connection or communication between the sending device and a receiving device. In this manner, a secure offline content streaming solution is provided that maintains the security of the data shared in that the sending device controls when and how the receiving devices view and/or process the streamed content.

Figure 3:
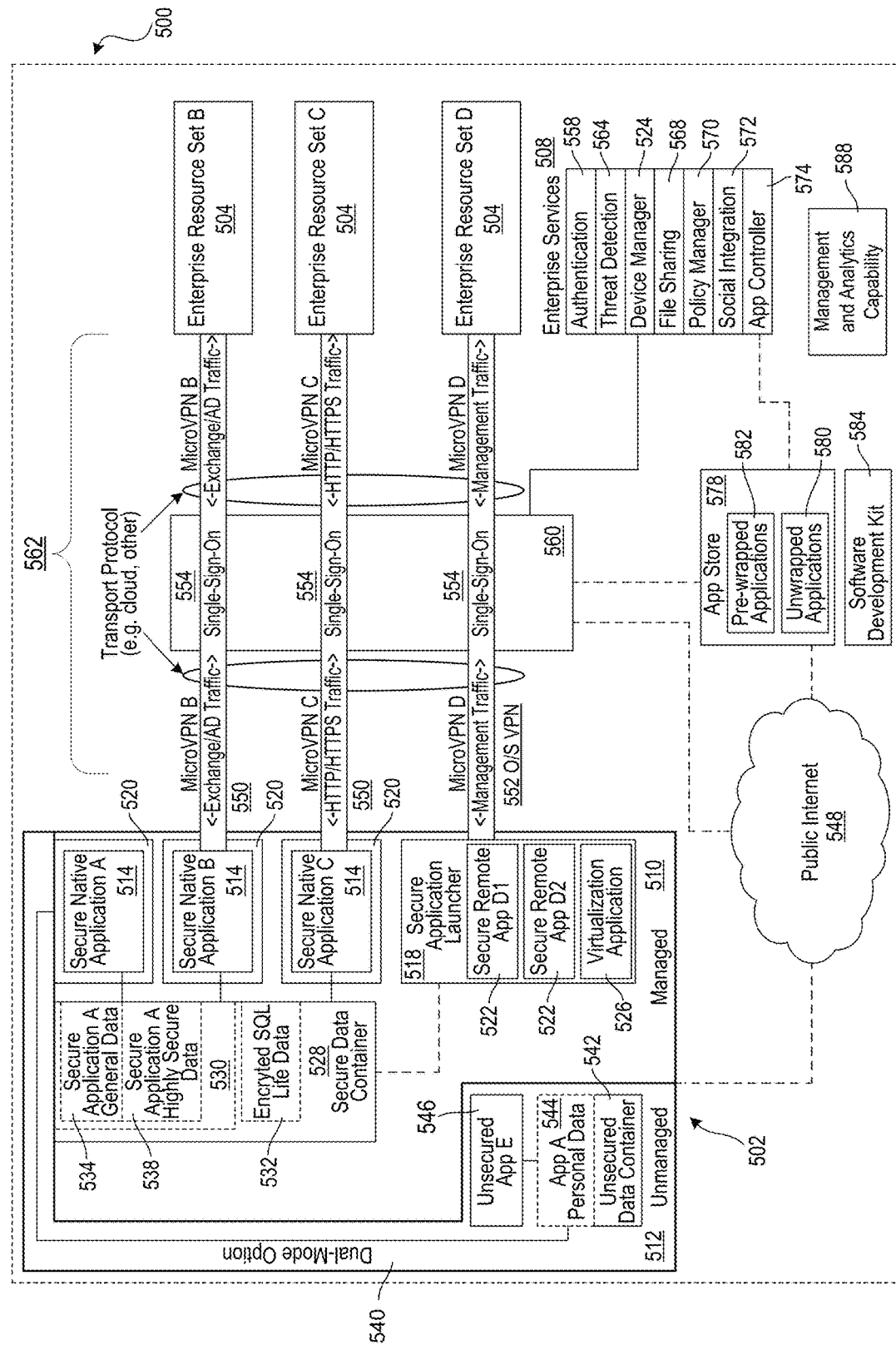
FIG. 3 depicts an illustrative enterprise mobility management system.

FIG. 3 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. For example, enterprise resources 504 or enterprise services 508 may include a secure caching service within the mobile device 502 for secure storage of content, as explained in more detail below. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
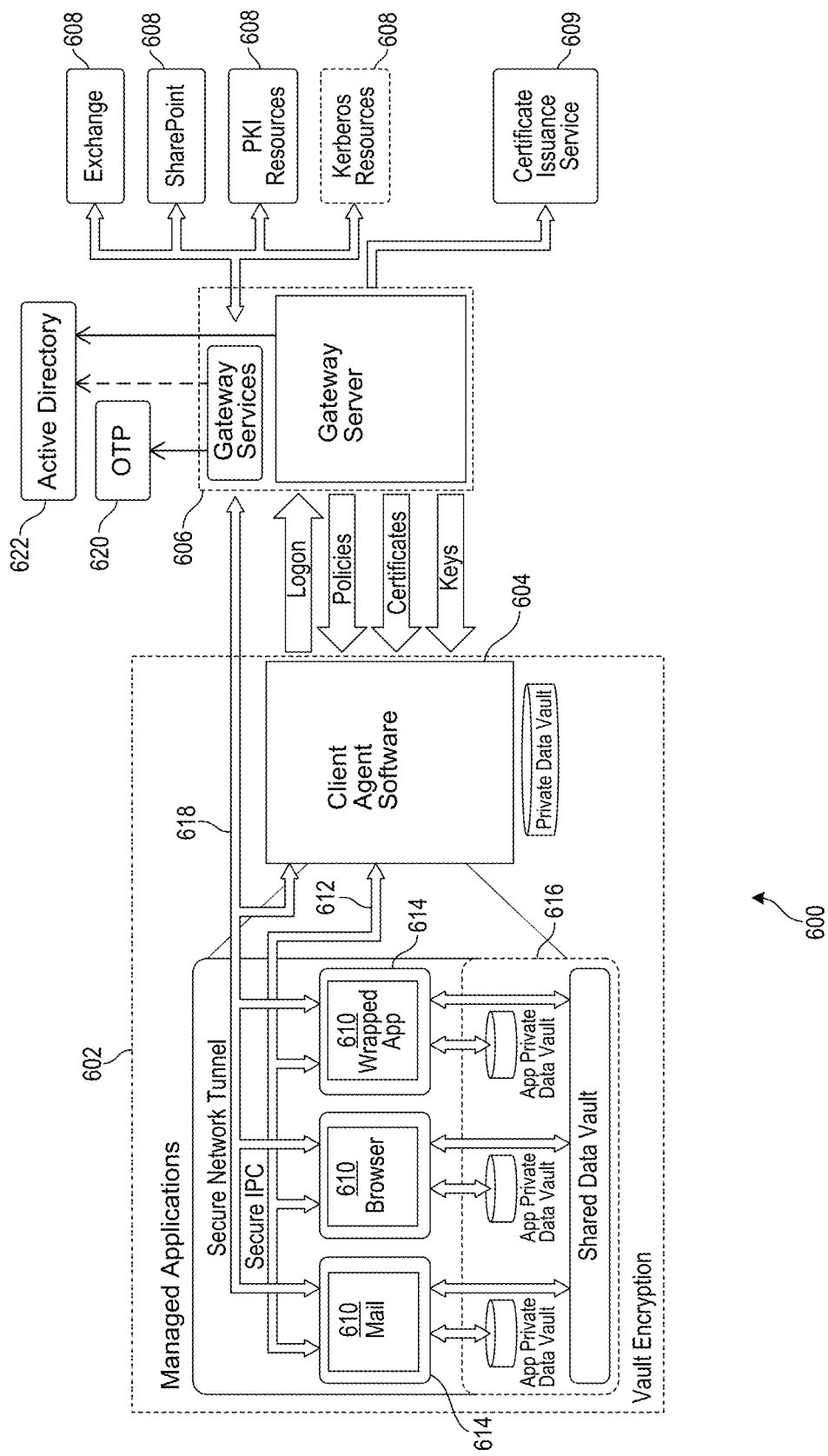
FIG. 4 depicts another illustrative enterprise mobility management system.

FIG. 4 is another illustrative enterprise mobility management system 600. Some of the components of the mobility management system 500 described above with reference to FIG. 3 have been omitted for the sake of simplicity. The architecture of the system 600 depicted in FIG. 4 is similar in many respects to the architecture of the system 500 described above with reference to FIG. 3 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

Another managed application 610 may include a wrapped secure storage application that prevents access to a storage cache from the mobile device 602. Rather, access and control of the wrapped storage application may be controlled by another device remote from the mobile device. As explained in more detail below, the wrapped storage application may be used during streaming of content to the mobile device 602 for storage of segments of the content in a secure manner. The secure storage application may be obtained from an application store 578 as described above and stored on the mobile device 602. Activation or utilization of the storage application may occur during receiving of content from a streaming device over an offline session.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Secure Offline Streaming System

Figure 5:
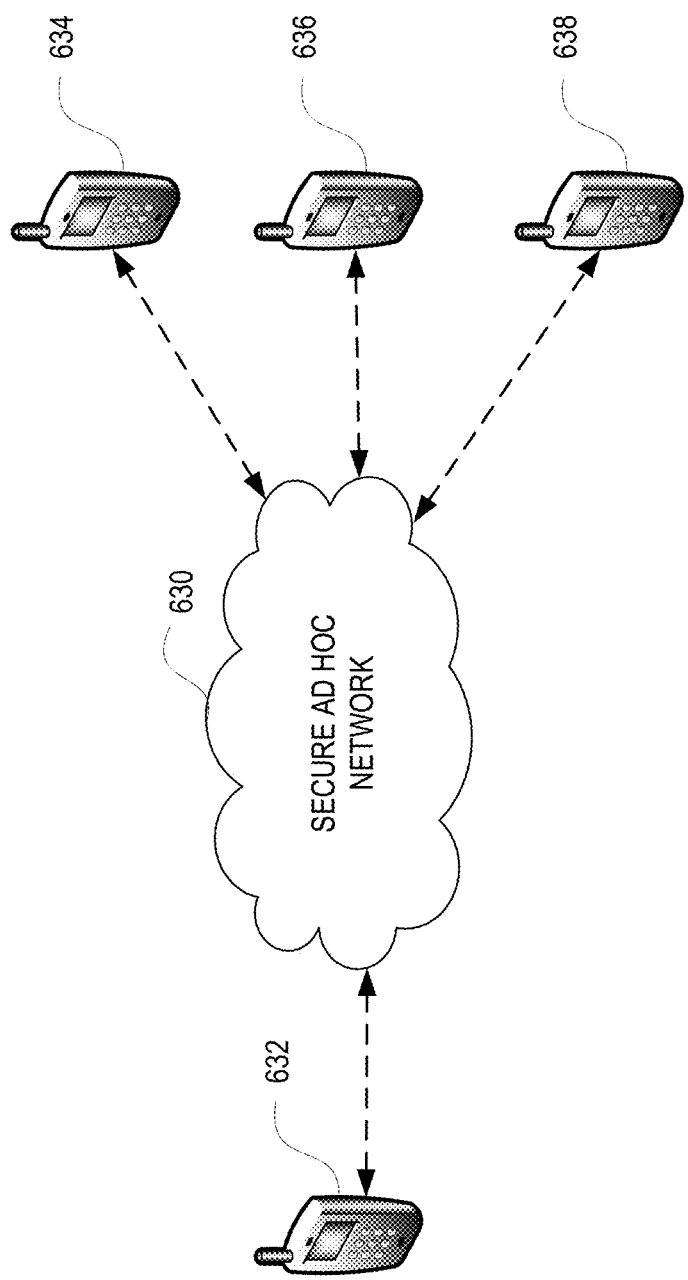
FIG. 5 depicts an example of streaming of content from a sender device to one or more receiving devices in an offline environment.

Through one or more components of the above systems may be used to provide a secure offline streaming of content from a sender device to one or more receiving devices. Offline streaming of data may include the transmission of data from a sending device to a receiving device, often in a sequence of ordered data packets, over a network generated by the sending device or any other network that is limited to the sending device and one or more receiving devices. For example, offline streaming of data may include the transmission of data over a network that is not connected to the Internet. In general, however, any type of transmission of data from the sending device to the receiving device over a network generated by or originating at the sending device may be considered as a data stream. For example, a user of a device may desire to provide, in a secure manner, content or data to other receiving devices in an offline environment (such as an environment in which the devices are not connected to the Internet, wifi, or other potentially secure network connection). FIG. 5 depicts an example of streaming of content from a sender device to one or more receiving devices in an offline environment. The sending device 632, such as a cellular or mobile computing device, may transmit data over a network 630 created by the sending device to one or more receiving devices 634-638. For example, the sending device 632 may generate an ad-hoc local wireless network to communicate with one or one or more receiving devices. The generation or creation of the network 630 by the sending device is discussed in more detail below. Although depicted in FIG. 5 as mobile computing devices, the sending device 632 and receiving devices 634-638 may be any computing device capable of connecting to and receiving data over a network 630. Thus, the sending device 632 and receiving devices 634-638 may be personal computers, laptop computers, tablet devices, servers, televisions, monitors, networking devices, and the like.

In one particular example, a user of the sending device 632 may share content (such as a video, movie, audio, etc.) to the receiving devices 634-638. The sender may provide the data or content so that a user can to view or hear on the user's device 634-638, but wish to prevent the receiving device from retaining the data for future use. Generally, sharing data device-to-device without using security protocols and devices on a public or private network connection may allow the data to be obtained and stored by receiving devices for future use. In other examples, the sender may be unaware that sharing the content over the ad-hoc local network 630 with the receiving devices 634-638 is unsecure and thus may inadvertently provide the content to the receiving devices. Users of the receiving devices 634-638 or the receiving devices themselves may then share the data with other devices unauthorized to receive such data. Further, the network over which the data is being shared may be vulnerable for interception of the data from the sending device by an unauthorized receiving device.

A secure offline content streaming system is thus provided herein for streaming data from a sending device 632 to one or more receiving devices 634-638. To secure the stream of content, the sending device 632 may segment the content and transmit each segment to the receiving devices 634-638 over the network 630 created by the sending device to which the receiving devices connect, as explained in more detail below with reference to FIG. 8A. Further, a secure container or cache may be generated on the receiving devices that is controlled by a service executed on the sending device 632 and a corresponding service executed on the receiving device for storage of the content segments. Through operation of the corresponding services, the sending device 632 may control access privileges to the secure container of the receiving device. For example, a receiving service executed on the receiving device 634-638 may be controlled by the sending device 632, through one or more instructions, to control access to the secure container by the receiving device 634. In this manner, the sending device 632 may control which content segments are stored at the receiving devices 634-638, thereby allowing the sending device to temporarily cache the content segments at the receiving devices 634-638, replacing cached data with new data as it arrives at the receiving devices such that only a portion of the content is stored at the receiving devices 634-638.

Figure 6:
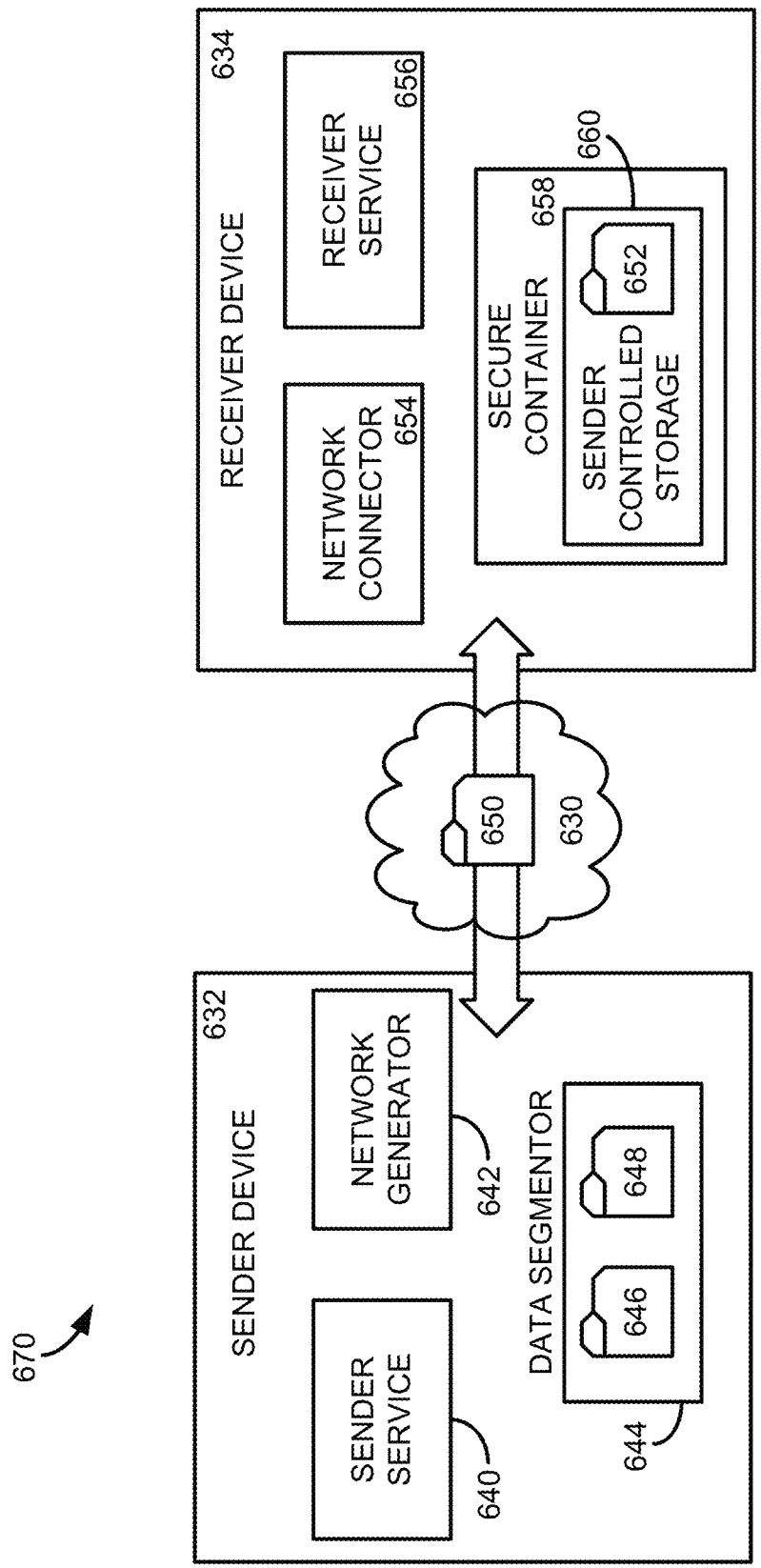
FIG. 6 depicts an illustrative system for streaming of content from a sender device to one or more receiving devices in an offline environment.

FIG. 6 depicts an illustrative system 670 for streaming of content from a sender device 632 to one or more receiving devices 634 in an offline environment. The sending device 632 and receiving device 634 of FIG. 6 is similar to the sending device and receiving device discussed above with relation to the system of FIG. 5. As discussed, the sending device 632 may share content or data with the receiving device 634 over an ad-hoc local network 630 created when the receiving device 634 securely connects to the sending device 632. The sending device 632 may thus include a network generator 642 component or components to communicate with the receiving device 634. The local network 630 created by the sending device 632 may be a wireless network or a wired connection. For example, the sending device 632 may generate a wireless connection signal and broadcast that signal to other devices in the vicinity of the sending device. One or more receiving devices 634 may detect the wireless network generated by the sending device 632 and, through a modem or other communication unit, connect to the sending device over the network. In another example, the sending device 632 may create a Local Area Network (LAN) that connects the sending device to other devices similarly connected to the LAN through a wired connection. Receiving devices 634 may include network connector components 654 for communicating with the sending device 632 over the local network 630, either in a wireless or wired network. The authentication and authorization of the receiving device 634 on the local network 630 with the sending device 632 is discussed in more detail below.

Once connected, the sending device 632 may provide content or data to the receiving device 634. In one implementation, the sending device 632 may segment the content or data to be sent to the receiving device 634 prior to sending the content or data. A data segmentor component 644 may be included with the sending device 632 to segment the data or content into segments 646-652. Although illustrated as a separate component, the data segmentor 644 may be included or otherwise associated with the sender service 640 or program. The size of each of the segments of the data may be any size, such as k number of bytes per segment. For example, the data segmentor 644 may segment the entire data file to be transmitted to the receiving device 634 into equal k number of bytes per segment. In another example, the size of each segment may vary. The variation of the size of the segments of data may be based on one or more operational measurements of the system 670, such as a measured transmission bandwidth to the receiver device 634, the number of devices receiving the segmented data, a status of an output queue of the sender device 632 or input queue of the receiver device 634, and the like. The size of each segment may also be customizable by the sending service 640 and, in some instances, may be based on the sending device 632 for the session or the requesting device 634. For example, the sending service 640 may receive information about the secure container 658 and/or secure cache 660 created on the receiving device 634 by the receiving service 656, such as storage size constraints of the created secure storage. The sending service 640 may then determine the segment size of the content based on the received information of the secure cache 660 of the receiving device 634. The sending service 640 may thus cap the size of each segment to fit within the size of the secure cache 660. In another example, the sending service 640 may allow a user of the sending device 632 to select the segment size to be transmitted to the receiving device 634.

The sender service 640 may be a program or other software that is executed by the sending device 632 to perform one or more of the operations of the sending device described herein. Thus, a user of the sending device 632 may download or otherwise install the sender service 640 on the sending device 632, such as from an online store as described above. To send content to the receiving device 634, a user of the sending device 632 may execute the sender service 640 on the sending device 632. The sending service 640 may then, in addition to other operations, connect the receiving device 634 with the sending device 632 over the ad-hoc network 630 and/or segment the data or content into segments for streaming to the receiving device, as described in more detail below with relation to FIG. 7. The transmission of a content segment 650 from the sending device 632 to the receiving device 634 is illustrated in FIG. 6.

In a similar manner, the receiving device 634 may include a receiver service 656 or program. A user of the receiving device 634 may download, from an online store or other repository, the receiver service 656 and install the service on the receiving device 634. The receiver service 656 may perform one or more of the functions described herein for the receiving device 634. For example, the receiving service 656 may connect, through a network connector component 654 of the service or receiving device 634, to the sending device 632 to receive the stream of content or data, such as by detecting the network connection, providing a predefined password, identifying the receiving device 634 to the sending device 632, etc. In addition, the receiving service 656 may create and wrap a secure container 658 for storing the transmitted and received content segments, such as content segment 652. In some implementations, the secure container 658 may be a secure native application that is wrapped by a secure application wrapper to control access to the secure container through one or more policies, as described above. The secure application wrapper may include integrated policies that are executed on the receiving device 634 when the secure native application is executed on the receiving device 634. The secure container 658 may include a sender controlled storage or cache 660 in which the received content segments are temporarily stored, as explained in more detail below.

To provide sender control over the sender controlled storage 660, an IPC link may be created between the secure container 658 and the receiver service 656 and/or the sender service 640 over ad-hoc network 630. The IPC allows the sending service 640 to supply policies to be enforced by the application management framework "wrapping" the container 658. In some instances, the sender service 640 may control read/write requests to the secured cache 660. The secured container 658 creates a temporary cache 660 that is encrypted and can only be accessed by the receiver service 656 for temporary display on the receiving device 634. Local data transfer may be prevented at the receiving device 634, such as by preventing any data from being locally transferred outside the secure container 658, e.g., by copying it or sending it to an external application. In this manner, content segments provided to the receiving device 634 may be securely and temporarily cached for display by the receiving device 634 without giving access to the content segments by the receiving device 634.

Figure 7:
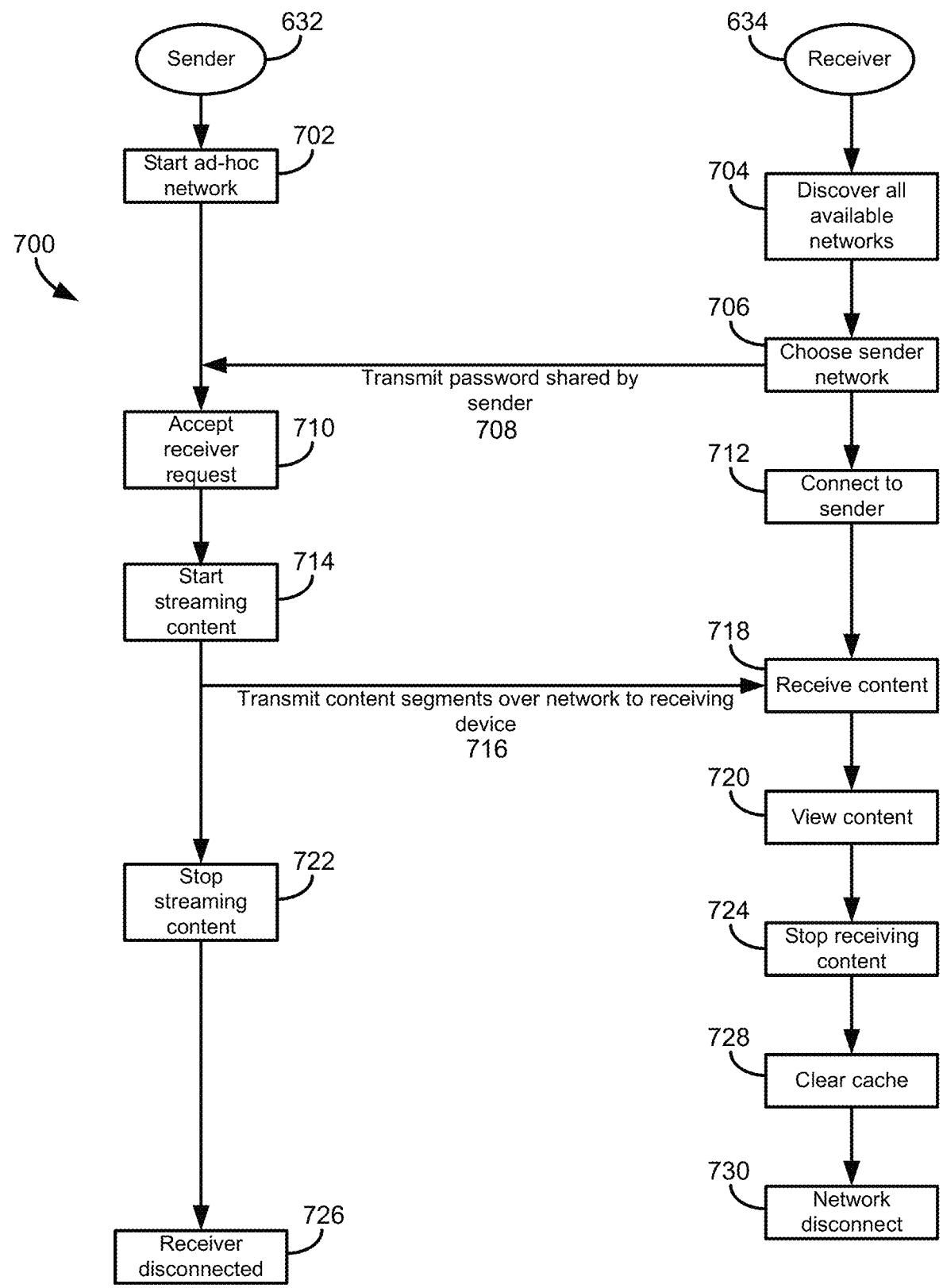
FIG. 7 depicts a flowchart of an overview of a method for streaming of content from a sender device to one or more receiving devices in an offline environment.

Through the systems and components described above, a sending device 632 may securely provide content to one or more receiving devices 634 in an offline environment. FIG. 7 depicts a flowchart of a general overview of a method 700 for streaming of content from a sender device 632 to one or more receiving devices 634-636 in an offline environment. Many of the operations of the method 700 are discussed in more detail in reference to FIGS. 8-10. In some implementations, the operations of the method 700 are performed by the sender service 640 executed on the sending device 632 and/or the receiving service 656 executed on the receiving device 634 to manage the secure transmission of data or content from the sending device to the receiving device. However, any component of either device may perform any of the operations discussed herein. Further, although only a single instance of a receiving device 634 is illustrated in FIG. 7, any number of receiving devices may connect to the sending device to receive the content or data following the same or similar operations as described below.

In operation 702, the sending device 632 may create an ad-hoc network for sharing data to other devices offline (i.e., without connecting to the Internet or other public or private network). To create the ad-hoc network, the sender service 640 may utilize the network generator component 638 to begin broadcasting a protected ad-hoc private network to nearby receiving devices 634-638. The receiving device 634 may enter a discovery mode in operation 704 to detect or discover available networks in the reception area of the receiver, including the ad-hoc network created by the sending device 632. The discovery operation may occur before or after the creation of the ad-hoc network. In the discovery mode, the receiving device 634 may monitor for available wired or wireless networks through a cellular connection, wifi, wired connection, and the like.

Upon detection of the ad-hoc network, the receiving device 634 may choose the sender device ad-hoc network from a list of available networks in operation 706. For example, creation of the ad-hoc network may include providing a network identifier, such as an identification of the sending device 632 or other network identifier. A list of available networks detected by the receiving device 634 may be displayed on a display device portion of the receiving device 634 from which a user of the receiving device 634 may select the network associated with the sending device ad-hoc network identifier. Upon selection, the receiving device 634 may begin connecting to the sending device 632 over the selected network.

In one example, connection of the receiving device 634 and the sending device 632 may include an authorization and acceptance procedure to verify the receiving device 634 to receive the content. The receiving device 634 may provide a password to the sending device 632 in operation 708 to authenticate and verify the receiving device 634. The password may be provided the sending device 632 or by a user of the sending device for purposes of connecting the devices. In some instances, the password may be pre-shared to the receiving device 634 over a public network or otherwise when the receiving device is connected to a network. In other instances, a user of the sending device 632 may verbally share the password for use in authenticating the receiving device 634 over the network. In this manner, the sending device 632 may verify and connect only to those receiving devices 634 that provide the approved password. In some instances, each receiving device 634-638 may receive a unique password such that each connection to a receiving device creates a unique session over the network. The verification of the receiving device 634 with the sending device 632 may be optional, in some implementations. In operation 710, the sending device 632 may accept and/or authorize the receiver's request to connect and, in operation 712, the receiving device 634 is connected to the ad-hoc network. The connection of the sending device 632 to the receiving device 634 may create a communication session during which data may be transmitted between the devices. The communication session may end when the devices disconnect, as described in more detail below. In this manner, the sending device 632, in addition to creating the ad-hoc network, may control the receiving devices 634-638 that connect to the network to receive the content or data.

In operation 714, the sending device 632 may begin content to the receiving device 634 over the ad-hoc network. As described in more detail below, the content may be segmented before transmission to the receiving device. Further, the sending device 632 (or sender service 640) may be responsible for deciding authorization parameters of any shared file and/or connected receiving device 634. For example, the sending device 632 may provide authorization to view a particular file to a subset of connected receiving devices and block access to view the particular file to others. Thus, during a communication session, data or content may only be streamed to those connected receiving devices 634 that the sending device has approved to receive the streamed data or content. The authorization parameters granted to a particular receiving device 634 may be revoked, altered, or otherwise adjusted during a session to prevent a receiving device from accessing particular content or to remove the receiving device from the network connection entirely.

Receiving devices 634 authorized to receive the streamed data or content may begin receiving the stream in operation 716. In particular, a segment of the content of a number of bytes may be transmitted over the network to the receiving device 634. The bytes of data are received at the receiving device 634 in operation 718 and the data may be processed or rendered for display on the receiving device in operation 720. For example, the sending device 632 may stream a multimedia file, such as a video, to the receiving device 634 over the secure ad-hoc network in segments. In other examples, the data may be processed by the receiving device 634 without being displayed on the display device. The receiving device 634 may process the received segments to render the video and display the video on a display device component of the receiving device. In this manner, the sending device 632 may stream the content to the receiving device for viewing (or hearing, or reading, etc.) securely in an offline environment. In particular, by verifying the identity of the receiving device 634, only authorized devices may receive the data segments. Further, by segmenting the streamed content or data, such data may be temporarily cached at the receiving device such that less than the whole of the content is ever stored at the receiving device at any time. The temporary storage of the data segments is described in more detail below with reference to FIGS. 8A-8B.

In addition, the transmitted segments of the content may be stored in a secured storage container or cache that is controlled by the sending device 632. The storage of the segments may be temporary such that only a portion of the overall streamed content is present on the receiving device 634. In one example, the receiving device 634 may only store only one segment of content at any time. The stored segment or segments may only be accessed from the secure cache 660 through the receiving service 656 and access privileges for the secure cache may be controlled by the sending service 640 providing instructions to the receiving service 656 over the network. For example, the sending service 640 may provide encrypted storage instructions to the receiving service 656 to store a segment when the segment is transmitted to the receiving device. The encrypted storage instructions may only be decrypted by the receiving service 656 executing on the receiving device 634 such that the sending service 640 (or sending device 632) controls the receiving service access to the secured storage container 658. For example, a decryption key may be provided to or generated by the receiving service 656 to decrypt the received encrypted instructions. In another example, the receiving service 634 may access the secure container 658 upon receipt of the segment while access to the container by native applications executed on the receiving device 634 is restricted. In this manner, only the receiving service 634 may write/read from the secure container 658 through instructions provided by the sending device 640 or through the granting of read/write permissions to the receiving service 656.

In one implementation, the connection between the sending device 632 and the receiving device 634 may be a Transmission Control Protocol (TCP) connection. The TCP connection ensures that transmitted segments arrive in-order at the receiving device 634. Operations 714-720 and the transmission of data or content segments are described in more detail below with reference to FIG. 8.

In operation 722, the sending device 632 may finish or otherwise stop streaming the content to the receiving devices 634-638. Streaming of the content to the receiving devices 634-638 may end at the last segment of content that is transmitted or if the connection between the sending device and the receiving devices is interrupted. For example, the sending device 632 may transmit a "terminate-stream" signal to the receiving devices 634-638 that would end the communication session between the devices. In another example, the sending device 632 may move out of range of the receiving device 634 such that communication between the devices ends. In another example, the sending device 632 may encounter a reset or other issue that severs the communication session of the devices. Regardless of the reason, the streaming of the content may cease and the receiving device 634 may stop receiving content in operation 724. In operation 726, the sending device 634 disconnects the receiver from the ad-hoc network through one or more network authentication parameters controlled by the sending device. In operation 728, the secure cache on the receiving device 634 is cleared of any remaining content segments. In some instances, a poison pill procedure may be executed by the receiving service 656. The poison pill procedure uses a countdown timer that is reset when a new content segment is received. If the timer reaches zero or other preset limit, the receiving service 656 deletes any stored segments in the secure cache 660 to ensure that no segments remain on the receiving device 634. The cache may also be cleared upon a receipt of an end of the stream from the sending device 632. The termination of the connection between the devices is described in more detail below. In operation 730, the receiving device 634 is disconnected from the network based on a disconnect signal provided by the sending device 632 to the receiving device 634. The disconnect signal indicates to the receiving device 634 to disconnect from the communication session with the sending device 632.

Figure 8A:
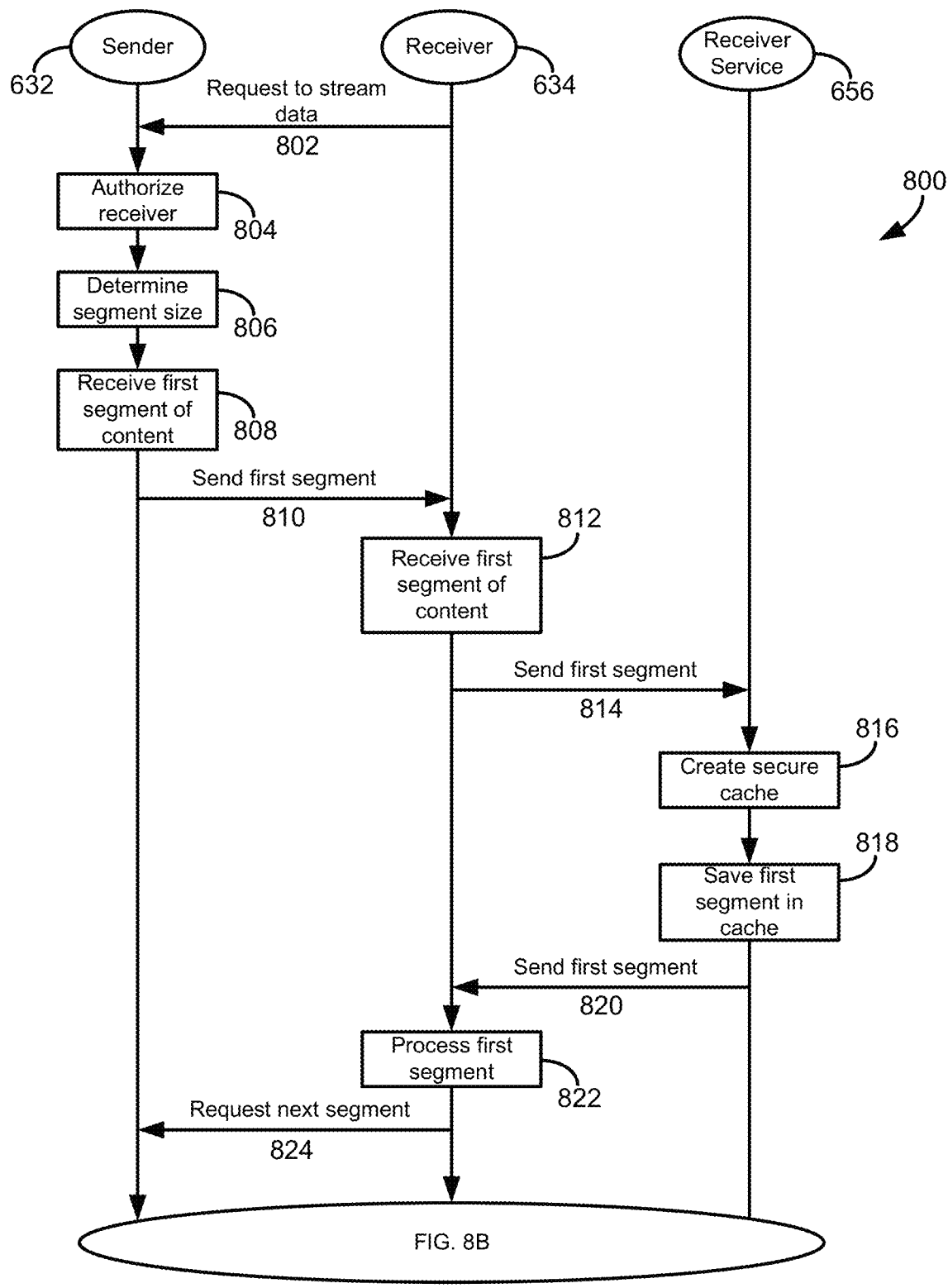
FIGS. 8A-8B depicts a flowchart of a method for offline streaming of content to an authorized receiving device using a service of the receiving device.
Figure 8B:
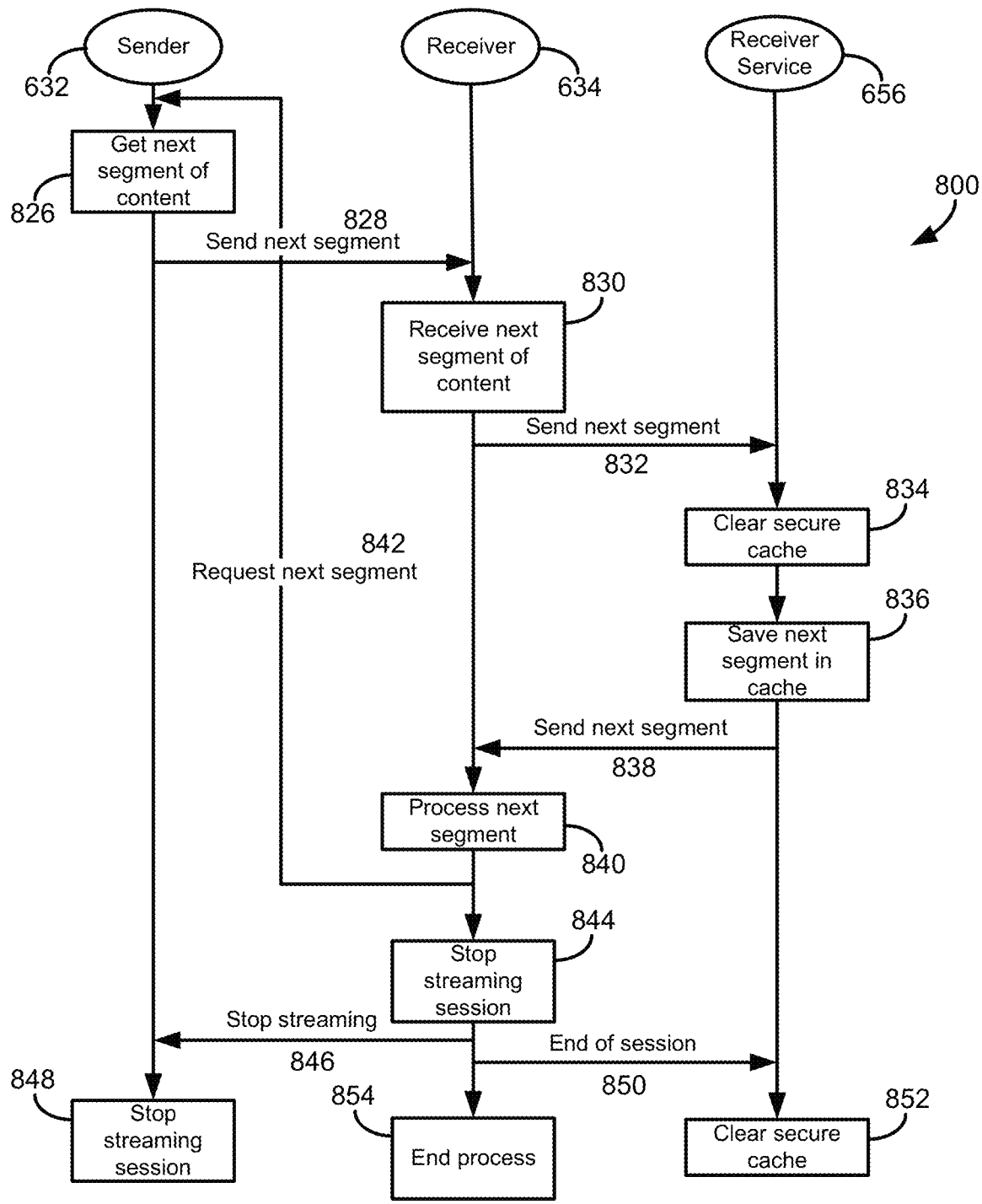

FIGS. 8A-8B depicts a flowchart of a method 800 for offline streaming of content to an authorized receiving device 634 using a service 656 of the receiving device. The operations of the method 800 provide further information concerning operations 714-720 described above with relation to FIG. 7. However, the method 800 illustrates the relationship between the receiving device 634 and the receiving service 656 to receive and store content segments in a secure cache 660 within a secure container 658 created within the receiving device. Although the operations are presented as being performed by the sending device 632, the receiving device 634, and/or the receiving service 656, other components of the devices may perform one or more of the operations.

In operation 802, the receiving device 634 transmits a request to the sending device 632 to receive streamed data. In some instances, the request to receive the streamed data may include an identification of a requested segment. For example, the request may be for the first segment or beginning of the content stream to be transmitted to the receiving device 634. In other instances, however, the receiving device 634 may request a segment at a point within the content stream other than the beginning of the stream. For example, a user of the receiving device 634 may choose to view the stream in the middle or may seek forward or backward within the stream. A starting segment identification may be provided by the receiving device 634 to determine which content segment is to be sent to the receiving device. For example, each segment of the content may be identified by a number or some identifier indicating the placement of the segment within the order of the streamed content segments, such as a segment 0001, segment 0002, segment 0003, etc. In general, any identification of a segment and the segments relative location within the stream of content segments may be used. The request from the receiving device 634 may thus include a segment identification for a beginning of a requested segment. For example, the request may include a starting segment identification of segment 0002 to request the second segment in the stream. In another example, the request for a segment may include a segment identification for an ending of the requested segment, such as providing ending segment identifier 0003 to request segment 0002 of the stream. By providing a starting and/or ending segment identifier, the receiving device 634 may request to receive segments from the beginning of the content stream (by requesting segment 0001) or within the content stream (by requesting segment 0002, 0003, etc).

In some instances, the sending device 632 may provide the next segment of content to the receiving device 634 upon a request, regardless of where in the stream of content the segments are being transmitted. For example, the sending receiving 632 may be transmitting the segments to one or more receiving devices 634. During the transmission to the receiving devices 634, a new receiving device may connect to the sending device 632 to receive the data. During connection, the requesting device 634 may request to receive a segment of data, as described. The sending device 632 may transmit, in some instances, the next segment of the stream to all receiving devices, including the newly connected receiving device, regardless of which segment in the stream of data is the next segment to transmit. In this manner, all of the receiving devices 634, including the newly connected receiving device, may receive the same segments of the content stream at the same time, regardless of when the receiving device requested to receive the content stream.

In operation 804, the sending device may authenticate the request transmitted from an authorized receiving device 634. As described above, receiving devices 634-638 may be authenticated to the sending device 632 through a provided password or other security exchange that verifies the device 634 to the sending device 632. The request received at the sending device 632 to receive the content may similarly include an identifier that identifies the requesting device 634, such as an IP address, MAC address, or other device identifier. The sending device 632 may then verify the identity of the device transmitting the request based on the identification and password included in the request. In operation 806, the sending device 632 may determine a segment size for segmenting the content, such as k number of bytes. In one implementation, the sending service 640 segments the content to be shared. The size of each segment is customizable by the sending service and, in some instances, may be based on the sending device 632 for the session or the requesting device 634. For example, the sending service 640 may receive information about the secure container 658 and/or secure cache 660 created on the receiving device 634 by the receiving service 656, such as storage size constraints of the created secure storage. The sending service 640 may then determine the segment size of the content based on the received information of the secure cache 660 of the receiving device 634. For example, the sending service 640 may cap the size of each segment to fit within the size of the secure cache 660. In another example, the sending service 640 may allow a user of the sending device 632 to select the segment size to be transmitted to the receiving device 634. The segment size may also be used by the receiving service 656 to determine the size of the secure cache 660. For example, the receiving service 656 may only store one segment at a time in the secure storage 660 such that the secure storage only need to be the same size or slightly bigger than the size of the segments of the content. In another example, the size of each segment may vary, either during or prior to transmission of the content to the receiving devices 634. The variation of the size of the segments of data may be based on one or more operational measurements of the system 670, such as a measured transmission bandwidth to the receiver device 634, the number of devices receiving the segmented data, a status of an output queue of the sender device 632 or input queue of the receiver device 634, and the like.

The data segmentor 644 may begin segmenting the content into segments based on the determined segment size to generate the segments of content or data. The segments may be stored by the sending service 640 at the sending device 632 for transmission to the receiving device 634. In operation 808, the data segmentor 644 may provide or the sending service 632 may otherwise receive the requested segment of the content from the data segmentor 644, which may be the first segment of the content in the example shown. The requested segment may be transmitted, in operation 810, to the receiving device 634 over the secure ad-hoc network. The receiving device 634 may receive the transmitted requested segment in operation 812 and, in operation 814, send the segment to the receiving service 656 for storage in a secure cache 660.

In operation 816, the receiving service 656 may create the secure container 658 and an encrypted secure storage 660 within the container. In other instances, the secure container 658 may already be created by the receiving service 656 on the receiving device 634. In operation 818, the received segment of content may be stored in the encrypted secure cache 660 by the receiving service 656. Authorization to write data to the secure cache 660 may be limited to the receiving service 656 such that the receiving device 634 generally does not have write privileges to the secure cache. For instance, other programs or components of the receiving device 634 may be denied access to the received segment and/or the secure cache to secure the content segment at the receiving device. Access to the secure cache 660 may be controlled by an application wrapper that wraps the secure cache to control access through one or more policies applied by the wrapper. The receiving service 656 may be granted privileges to access the secure cache 660 by the application wrapper, while other native applications of the receiving device 634 may be denied access to the cache based on the policies enforced by the application wrapper and the receiving service 656.

The receiving service 656 may read the stored segment from the secure cache 660 and provide the content segment, in operation 820, to a processing component of the receiving device 634 for processing or displaying. For example, the data may include a portion of a video file that may be processed, in operation 822, by one or more processors and/or software programs of the receiving device 634 to display the video file on a display. In the instance where the content is an audio file, the processing of the content segment may include playing a portion of the audio file on a speaker of the receiving device. In an instance where the content is an image file, the processing may include generating the image from the content segment and displaying the image on the receiving device. In one particular implementation, the sending device 632 may be sharing the contents of a screen or display of the sending device with the receiving devices. In this example, images of the sending device screen or display may be generated and transmitted as segments to the receiving device 634 for display on the receiving device.

In operation 824, the above process may be repeated for additional segments of the content. For example, the receiving device 634 may send a request for the next segment or next number of bytes of the data in operation 824. The sending device, in operation 826, may generate or otherwise receive the next segment of content or data and transmit the next segment to the receiving device 634 in operation 828. Similar to above, the receiving device 634 may then receive, in operation 830, the next segment of content or data and provide the next segment to the receiving service 656 executed on the receiving device in operation 832. The receiving service 656 may clear the content of the secure cache 660 (in this example, the first content segment) in operation 834 and store the next segment in the secure cache in operation 836.

Through the clearing of the secure cache 660 before storage of the next content segment, the system ensures that only a portion of the content is stored in the secured cache at any one time. By limiting the storage of the content on the receiving device 634 to less than the total content or data file, security of the content or data file may be maintained. That is, the receiving device 634 does not receive all of the data or content file at one time (such as in a share-download process) and instead retains only a portion of the overall content file. By clearing the secure cache 660 of stored segments before storing additional segments, an additional security measure over control of the content is obtained.

In some instances, the receiving service 656 replaces each stored segment of content with the newly received segment such that only one segment is stored at a time to address latency in the processing and receiving of content segments from the sending device 632. In other instances, however, the secure cache 660 may operate as a buffer such that more than one segment may be stored at one time. For example, the receiving service 656 may store the three most recent received content segments in the secure cache 660. When a new content segment is received, the oldest stored content segment in the secure cache 660 may be deleted, while maintaining other content segments in the cache, and the new content segment may be stored. In this example, a timestamp or other indication of the age of the content segment in the secure cache 660 may be stored with the segment for use in determining which content segment is to be deleted. In another example, the receiving service 636 may determine a placement in the order of the content stream for the stored segments to determine the oldest segment. Regardless of the number of content segments maintained in the secure cache 660 by the receiving service 656, less than the whole of the content or data file is maintained on the receiving device 634. In some instances, a threshold value, such as a percentage of the entire data or content file, may be used to determine the number of content segments stored in the secure cache 660 at any one time. For example, the cache 660 may be cleared of older segments to ensure the cache does not store more than 25% of the data file.

In operation 838, the next content segment may be provided to the receiving device 634 for processing or displaying in operation 840, as described above. For example, the content being shared may be a movie file, with the first content segment being the first minute of the movie for display by the receiving device 634. The next content segment may be the next minute (or some other portion of the movie file) such that the next content segment is displayed on the display of the receiving device 634 following the first content segment. In this manner, processing of the streamed content or data file is displayed on the display of the receiving device 634. If additional content segments are to be transmitted to the receiving device 634, the process may repeat again through operation 842 to request the next content segment for transmission to and processing by the receiving device 634.

Streaming of content or data to the receiving device 634 may cease for several reasons. For example, the sending device 632 may determine that the stream of content has ended and cease providing content segments over the network. In another example, the sending device 632 and the receiving device 634 may lose connection over the network such that transmission of segments can no longer occur between the devices. In yet another example, the receiving device 634 may be notified of the end of the content stream and, as illustrated in operation 844 of the method 800 of FIG. 8, the receiving device 634 may transmit a stop streaming notification in operation 846 to the sending device 632. In this instance, the receiving device 634 may receive an indicator of a last segment in the content stream and, upon processing of the last segment, provide the stop streaming notification. In another example, a user of the receiving device 634 may select to disconnect with the sending device 632 or otherwise stop the stream of content and a stop streaming notification may be transmitted.

In operation 848, the sending device 632 may end the streaming session for the receiving device 634 that provides the stop streaming notification. The sending device 632 may continue to provide content segments to other receiving devices over the network so that the additional receiving devices continue the content stream. In addition, the receiving device 634 may notify the receiving service 656 in operation 850 of the end of the communication session with the sending device 632. In operation 852, the receiving service 656 clears the secure cache 660 of any remaining segments from the streaming session and, in operation 854, the receiving device 634 ends the secure offline streaming process.

Figure 9:
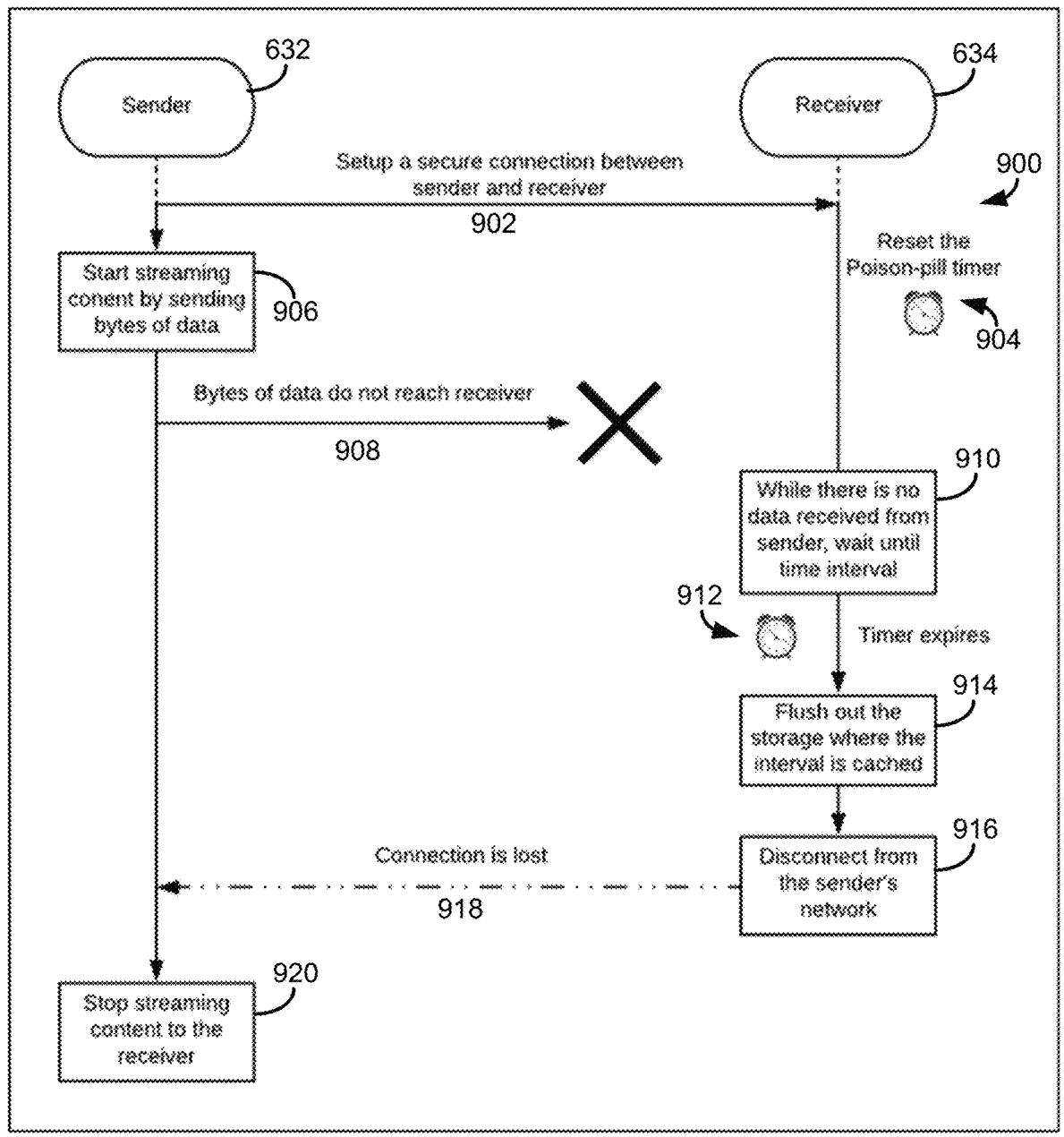
FIG. 9 depicts a flowchart of a method for deleting cached data from a secure, offline stream of content following a loss of data.

As discussed, the sending device 632 may cease streaming data or content to the receiving device 634. In the instance that the communication link between the devices is severed or interrupted, the receiving device 634 may be unaware that the link has been broken. The system described herein may therefore include a poison-pill timer to ensure that content segments stored at the secure cache 660 of the receiving device 634 be cleared. FIG. 9 depicts a flowchart of a method 900 for deleting cached data from a secure, offline stream of content following a loss of data or connection between devices. Although depicted in FIG. 9 as being performed by the sending device 632 and/or the receiving device 634, the operations of the method 900 may be performed by any component, program, or combination of component and program of the sending device or the receiving device. In particular, the operations may be performed by the sending service 640 of the sending device 632 and/or the receiving service 656 of the receiving device 634.

In operation 902, a secure connection is established between the sending device 632 and the receiving device 634 over an ad-hoc network, as described above. The secure connection may be for the purposes of streaming content from the sending device 632 to the receiving device 634. Upon setup of the secure connection, or upon the beginning of streaming of content to the receiving device 634, a poison-pill timer may be set in operation 904. The poison-pill timer may be a countdown timer that may be configurable by the sending service 640, sending device 632, or user of the sending device. The timer may be a hardware component, a software program, or a combination of both hardware and software components. The timer may be reset each time that the receiving device 634 receives a content segment from the sending device 632. In general, when the poison-pill timer reaches zero or other limit, content segments stored in the secure cache 660 may be flushed or deleted by the receiving service 636. Thus, the sending service 640 may set the poison-pill timer for any time to determine how long the receiving device 634 maintains content segments in the event of a break in the communication link between the devices.

In operation 906 of the method 900, the sending device 632 may begin streaming data or content to the receiving device 634, including sending segments of the content or data as described above. At some point during the stream of content, one or more segments may not be received by the receiving device 634, as illustrated in operation 908. The content segments may not arrive at the receiving device if a break in the communication link between the devices occurs. In another example, the content segment may arrive, but may be corrupted for any reason such that the receiving device 634 determines that the segment was not received in full. A new request for the corrupted content segment may be transmitted by the receiving device 634 in such a case, but the timer may continue to countdown until a uncorrupted segment is received.

Regardless of the reason for the failure to transmit the content segment, the poison-pill timer may continue to countdown while the receiving device 634 waits for the arrival of the next content segment in the stream in operation 910. In operation 912, the poison-pill timer may expire, such as by reaching zero or any other limit established by the sending device 632 or sending service 640. At the expiration of the timer, the receiving device 634 or the receiving service 656 may flush the secure cache 660 where content segments are stored in operation 914. Once flushed, the receiving device 634 may disconnect from the sender's network in operation 916 to end the streaming session with sending device 632. Disconnecting from the secure streaming session may cause the connection to be lost between the receiving device 634 and the sending device 632 in operation 918. In operation 920, the sending device 632 may stop streaming content to the receiving device 634. Thus, through the method 900, content segments stored at the receiving device 634 may be flushed if additional data or content segments are not received at the receiving device during a stream.

In another implementation, the receiving device 634 or the receiving service 656 may continually or periodically poll the connection to the sending device 632 to determine the connection status. For example, the receiving service 656 may send a request to the sending device 632 to verify the connection and wait for a verification message from the sending device in return. If the verification message is not returned, the stored content segments may be flushed immediately or upon the expiration of the poison-pill timer described above.

Figure 10:
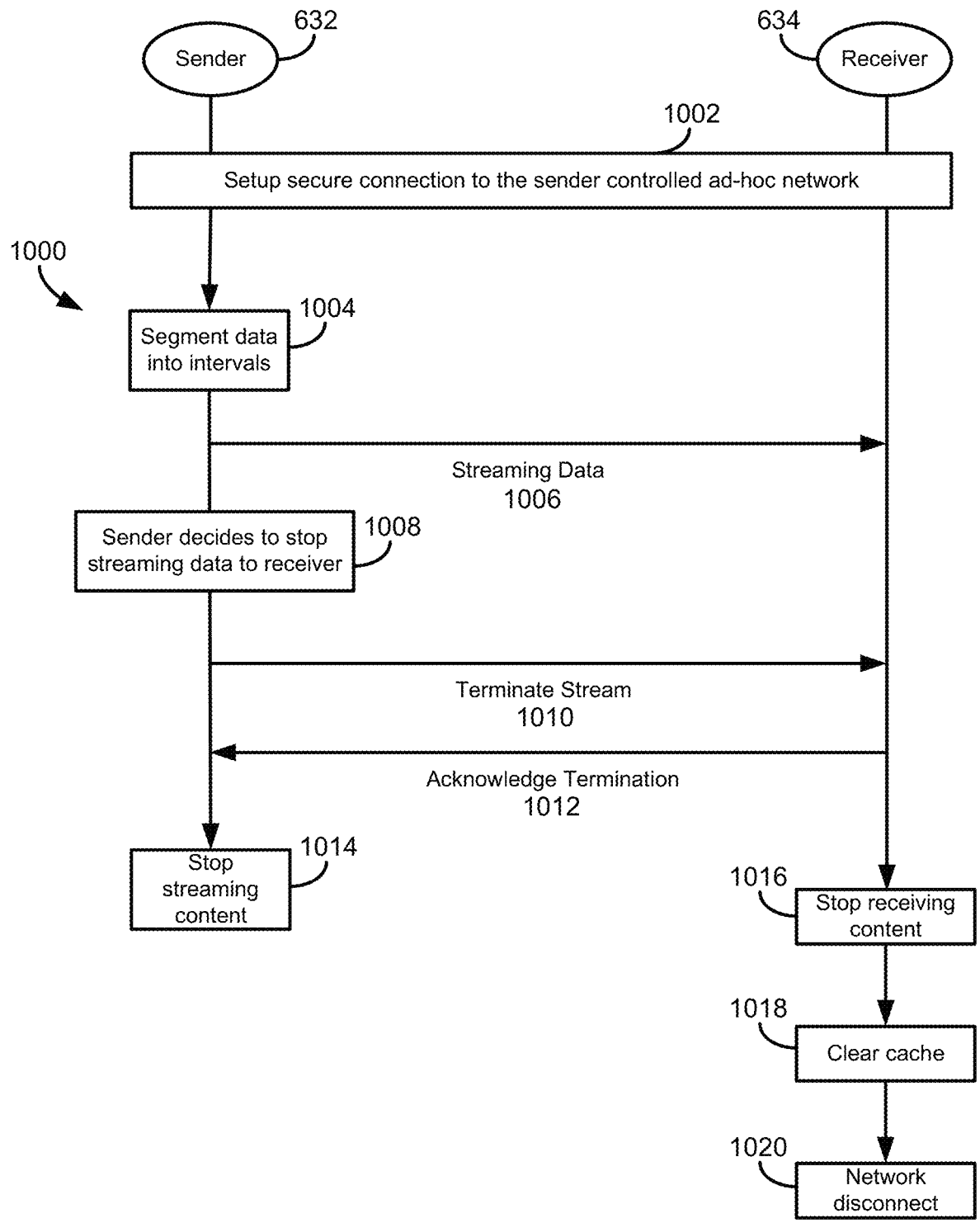
FIG. 10 depicts a flowchart of a method for disconnecting a receiving device from a secure, offline connection.

In still another example, the sending device 632 or sending service 640 may terminate the stream for any reason. FIG. 10 depicts a flowchart of a method 1000 for disconnecting a receiving device 634 from a secure, offline connection based on a termination notice provided by a sending device 632. Although depicted in FIG. 10 as being performed by the sending device 632 and/or the receiving device 634, the operations of the method 1000 may be performed by any component, program, or combination of component and program of the sending device or the receiving device. In particular, the operations may be performed by the sending service 640 of the sending device 632 and/or the receiving service 656 of the receiving device 634.

Similar to above, the sending device 632 and the receiving device 634 may create or setup a secure connection over a sender controlled ad-hoc network in operation 1002 for the secure transmission or streaming of content or data from the sending device to the receiving device. In operation 1004, the sending device 632 segments the content or data into segments as described and begins streaming the segments to the receiving device 634 in operation 1006. At some time, the sending device 632 may cease streaming the data or content to the receiving device 634 in operation 1008. For example, a user of the sending device 632 may end the data stream and provide an indication of the ending of the data stream to the sending service 640. In other examples, the sending service 640 may detect an end of the stream, an interruption in the content stream, and/or a change in the security of the connection between the sending device 632 and the receiving device 634 and elect to stop the data stream.

In operation 1010, the sending device 632 or sending service 640 sends a stream termination notification to the receiving device 634. The receiving device 634 or receiving service 656 returns an acknowledgment of the stream termination in operation 1012. Upon receiving the acknowledgment, the sending device 632 may stop streaming content to the receiving device 634 in operation 1014. In addition, the receiving device 634 may cease processing or displaying the content in operation 1016 and flush out remaining content segments stored in the secure cache 660 of the container 658 in operation 1018. In operation 1020, the receiving device 634 disconnects from the network. In this manner, a terminate-stream signal from the sending device 632 causes the receiving device 634 to delete the cached data such that no streamed data remains on the receiving device. In a scenario in that the terminate-stream signal is lost in the network or the receiving device 634 does not receive the signal for any reason, the poison-pill timer described above deletes any stored content segments and ends the connection with the sending device 632.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method for data sharing in an offline environment, the method comprising:
receiving, by a receiving device, a first data segment of a first quantity of data segments from a sending device via a local network, wherein the sending device and the receiving device directly communicate via the local network;
generating an encrypted storage container for storing the first data segment, wherein the encrypted storage container prevents access by one or more applications of the receiving device to data stored therein based on storage instructions from the sending device;
storing, by the receiving device and in the encrypted storage container, a second quantity of data segments comprising the first data segment, wherein the second quantity is less than the first quantity;

processing, by the receiving device, the first data segment to provide an output to a user of the receiving device;

activating a timer upon receipt of the first data segment of the first quantity of data segments; and upon the timer reaching a threshold value, deleting the second quantity of data segments stored in the encrypted storage container.

2. The method of claim 1 wherein processing of the first data segment comprises displaying a first portion of the data on a display of the receiving device.

3. The method of claim 2 further comprising:
receiving a second data segment from the sending device via the local network;
deleting, in response to receiving the second data segment and by a receiving service executed by the receiving device, the first data segment from the encrypted storage container;
storing, by the receiving service and after deleting the first data segment from the encrypted storage container, the second data segment in the encrypted storage container; and
processing the second data segment to present a second portion of the data on a display of the receiving device, the second portion of the data presented on the display subsequent to the first portion of the data.

4. The method of claim 3 further comprising:
receiving, from the sending device, a termination message; and
deleting, based on the termination message, the second data segment from the encrypted storage container.

5. The method of claim 1 wherein storing the second quantity of data segments in the encrypted storage container is based on a storage instruction transmitted from the sending device to the receiving device.

6. The method of claim 1 further comprising:
disconnecting, based on the timer reaching the threshold value, the receiving device from the local network.

7. The method of claim 1 further comprising:
resetting the timer upon receipt of a second data segment of the first quantity of data segments.

8. The method of claim 1, wherein the first data segment is received based on a password known to the receiving device and the sending device.

9. The method of claim 1, further comprising:
deleting, based on a receiving a termination notification, all data segments stored in the encrypted storage container.

10. A device comprising:
one or more processors; and
a receiver service module that, when executed by the one or more processors, cause the receiver service module to:
receive a first data segment of a first quantity of data segments and a storage instruction from a sender service module executed on a sending device, the first data segment and the storage instruction received via a local network;
instantiate an encrypted storage container on the device for storing data, wherein the encrypted storage container prevents access by one or more applications of the device to data stored therein based on the received storage instruction from the sender service module;
store, in the encrypted storage container, a second quantity of data segments comprising the first data segment, wherein the second quantity is less than the first quantity;
process the first data segment to display a first portion of the data on a display of the device;
activate a timer upon receipt of a data segment of the first quantity of data segments; and
upon the timer reaching a threshold value, delete all data segments stored in the encrypted storage container.

11. The device of claim 10 wherein the receiver service module, when executed by the one or more processors, further cause the receiver service module to:
receive a second data segment of the first quantity of data segments via the local network;
delete, in response to receiving the second data segment, the first data segment from the encrypted storage container;
store, after deleting the first data segment from the encrypted storage container, the second data segment in the encrypted storage container; and
process the second data segment to present a second portion of the data on the display of the device, the second portion of the data presented on the display subsequent to the first portion of the data.

12. The device of claim 11 wherein the receiver service module, when executed by the one or more processors, further cause the receiver service module to:
receive a termination message via the local network; and
delete, based on the termination message, the second data segment from the encrypted storage container.

13. The device of claim 10 wherein the receiver service module, when executed by the one or more processors, further cause the receiver service module to:
transmit a request for the first data segment of the first quantity of data segments, the request comprising an identification of the first data segment and an identification of the receiver service module.

14. The device of claim 13 wherein the receiver service module, when executed by the one or more processors, further cause the receiver service module to:
disconnect, based on the timer reaching the threshold value, the device from the local network.

15. One or more non-transitory computer-readable media storing computer-executable instructions that, when executed by a computer system comprising at least one processor, and least one memory, cause the computer system to perform a method comprising:
receiving, by a receiving device, a first data segment of a first quantity of data segments from a sending device via an offline local network, wherein the sending device and the receiving device directly communicate via the offline local network;
generating an encrypted storage container for storing the first data segment, wherein the encrypted storage container prevents access by one or more applications of the receiving device to data stored therein based on storage instructions from the sending device;
storing, in the encrypted storage container, a second quantity of data segments comprising the first data segment, wherein the second quantity is less than the first quantity;
processing the first data segment to provide an output to a user of the receiving device;
activating a timer upon receipt of a data segment of the first quantity of data segments; and upon the timer reaching a threshold value, deleting all data segments stored in the encrypted storage container.

16. The one or more non-transitory computer-readable media of claim 15, wherein processing the first data segment to provide an output to a user of the receiving device comprises displaying a first portion of the data on a display of the receiving device.

17. The one or more non-transitory computer-readable media of claim 16, having additional computer-executable instructions stored thereon that, when executed, further cause the computer system to perform:
   receiving a second data segment from the sending device via the offline local network;
   deleting, in response to receiving the second data segment and by a receiving service executed by the receiving device, the first data segment from the encrypted storage container;
   storing, by the receiving service and after deleting the first data segment from the encrypted storage container, the second data segment in the encrypted storage container; and
   processing the second data segment to present a second portion of the data on a display of the receiving device, the second portion of the data presented on the display subsequent to the first portion of the data.

18. The one or more non-transitory computer-readable media of claim 15, having additional computer-executable instructions stored thereon that, when executed, further cause the computer system to perform:
   receiving, via the offline local network and from the sending device, the first data segment of the first quantity of data segments and a first storage instruction, the first storage instruction configured to cause a receiving service to store the first data segment in the encrypted storage container.

19. The one or more non-transitory computer-readable media of claim 15, having additional computer-executable instructions stored thereon that, when executed, further cause the computer system to perform:
   transmitting, via the offline local network, a predetermined identifier of the receiving device to the sending device for verification.

20. The one or more non-transitory computer-readable media of claim 17, having additional computer-executable instructions stored thereon that, when executed, further cause the computer system to perform:
   receiving a termination message via the offline local network; and
   deleting, based on the termination message, the second data segment from the encrypted storage container.

* * * * *